Aug. 30, 1966   M. VAN ANTWERPEN ET AL   3,269,244
DEVICE FOR FEEDING, CUTTING AND DROPPING A MEASURED
LENGTH OF CUSHIONING MATERIAL
Original Filed Aug. 22, 1962                    6 Sheets-Sheet 1

Fig. 1

INVENTORS
MARTIN VAN ANTWERPEN
LESLIE G. FREEDY

BY

Aug. 30, 1966   M. VAN ANTWERPEN ET AL   3,269,244
DEVICE FOR FEEDING, CUTTING AND DROPPING A MEASURED
LENGTH OF CUSHIONING MATERIAL
Original Filed Aug. 22, 1962   6 Sheets-Sheet 2

INVENTORS
MARTIN VAN ANTWERPEN
LESLIE G. FREEDY

BY George N. Wright, Jr.

INVENTORS
MARTIN VAN ANTWERPEN
LESLIE G. FREEDY

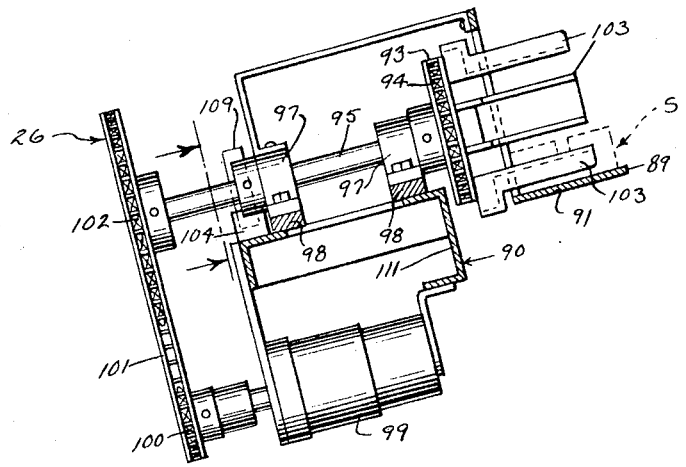

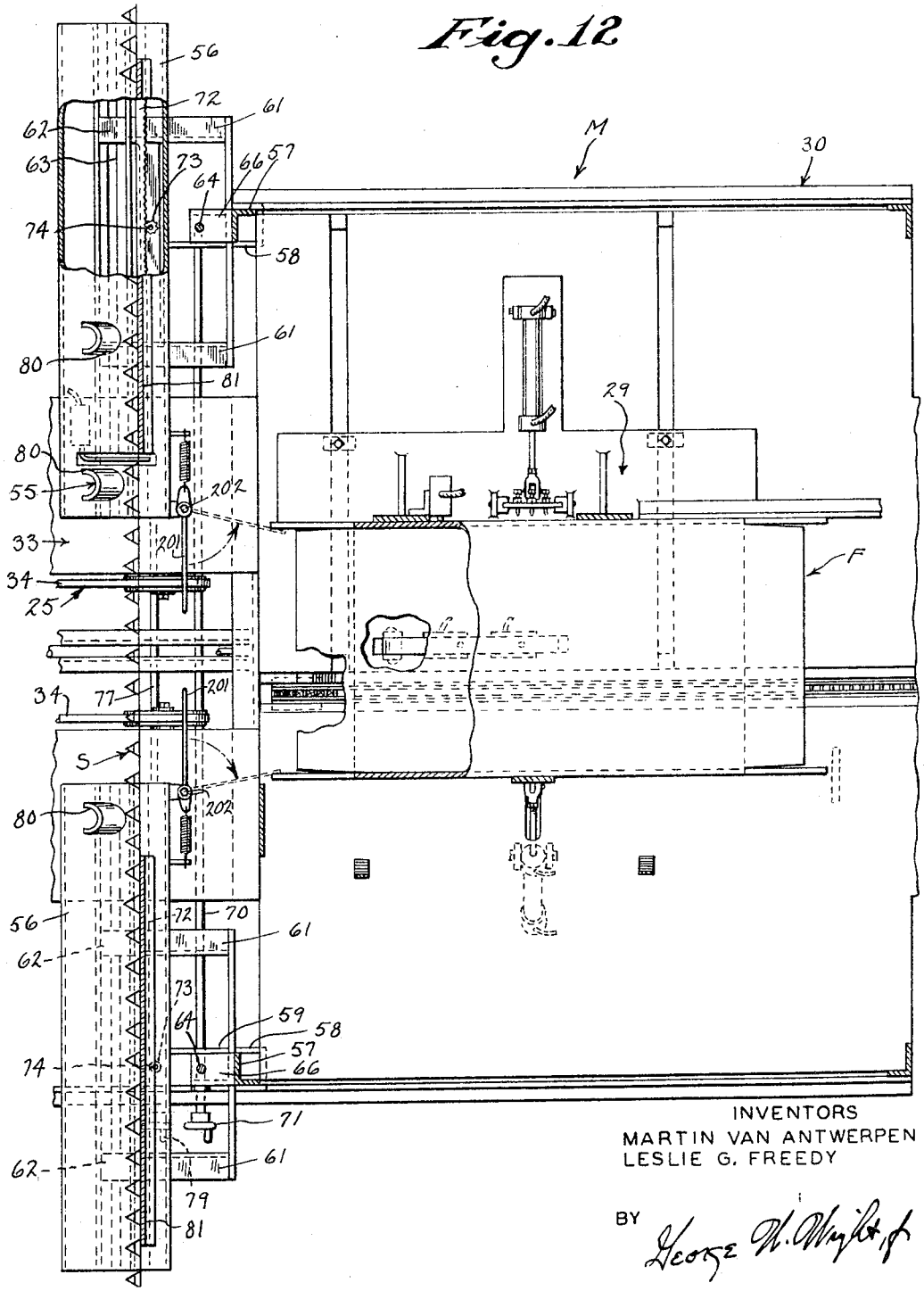

United States Patent Office    3,269,244
Patented August 30, 1966

3,269,244
DEVICE FOR FEEDING, CUTTING AND DROPPING A MEASURED LENGTH OF CUSHIONING MATERIAL
Martin Van Antwerpen and Leslie G. Freedy, Milwaukee, Wis., assignors to Vanant Company, Inc., Milwaukee, Wis., a corporation of Wisconsin
Original application Aug. 22, 1962, Ser. No. 218,700. Divided and this application Oct. 8, 1965, Ser. No. 494,090
4 Claims. (Cl. 83—222)

This invention appertains to packaging machines, and more particularly to a novel mechanism for feeding, cutting and applying a measured length of a shock absorbing and cushioning member around the articles to be packed, and is a division of our co-pending application Serial No. 218,700 filed August 22, 1962, and entitled, "Automatic Machine for Packaging Cabinets." The machine shown and described in the patent application Serial No. 218,700 has been so designed as to package any desired article; however, in the adaptation of the machine it has been shown for handling a bathroom medicine cabinet of the type having a front mirror which projects laterally from the sides of the body of the cabinet.

It is therefore one of the primary objects of this invention to provide a completely automatic machine for feeding the cabinets with the mirrors uppermost and in proper timed relation toward a means for setting up cartons in their tubular form from blanks, with means forming part of the present invention, disposed directly in front of the carton for delivering a measured quantity of a particular type of cushioning and shock absorbing strip in front of an approaching cabinet and in such a way that the strip will receive and be folded around the edge of the mirror as the cabinet is pushed into the awaiting set up carton.

Another prime object of the invention is to provide a novel mechanism for feeding a length of a slotted, peaked cushioning strip transversely across the machine and for cutting off a measured quantity of the strip and then guiding and dropping the strip with the peaks innermost in front of the mirror portion of a bathroom medicine cabinet as the same is advanced so that the strip will be properly folded around the mirror.

A further prime object of the invention is the provision of a platform with novel guides for receiving the measured length of peaked cushioning strip from the strip guiding and dropping means, so as to effectively hold the strip in proper position in front of the mirror portion of an advancing cabinet, the platform being constructed in spaced sections, so that the cabinet will ride between the sections and thus engage the portion of the strip lying across the sections for carrying the strip off of the platform with the strip folded around the mirror.

A still further important object of the invention is the employance of a simplified means for adjusting parts of the machine so that cabinets of various sizes and cushioning strips of various widths can be successfully handled.

With these and other objects in view, the invention consists in the novel construction, arrangement and formation of parts, as will be hereinafter more specifically described and claimed, and illustrated in the accompanying drawings, in which drawings, FIGURE 1 is a top plan view of the complete cabinet packaging machine ready for operation;

FIGURE 4 is a transverse detail sectional view through the cushioning strip advancing mechanism, the section being taken on the line 4—4 of FIGURE 3, looking in the direction of the arrows;

FIGURE 5 is a detail sectional view taken on the line 5—5 of FIGURE 4 looking in the direction of the arrows, and illustrating the means employed for governing the advancing of a predetermined length of the strip;

FIGURE 6 is a vertical detail sectional view taken on the line 6—6 of FIGURE 3, looking in the direction of the arrows and illustrating the guillotine mechanism for cutting off an advanced, measured quantity of the strip;

FIGURE 7 is a detail vertical sectional view taken on the line 7—7 of FIGURE 1, looking in the direction of the arrows, illustrating the cushioning peaked strip means for guiding and dropping the cut portion of the strip in front of an advancing cabinet;

FIGURE 12 is a fragmentary horizontal sectional view through the intermediate portion of the machine taken on the line 12—12 of FIGURE 2 of the drawings, the view showing the supporting platform for the peaked cushioning strip;

Figure 2:
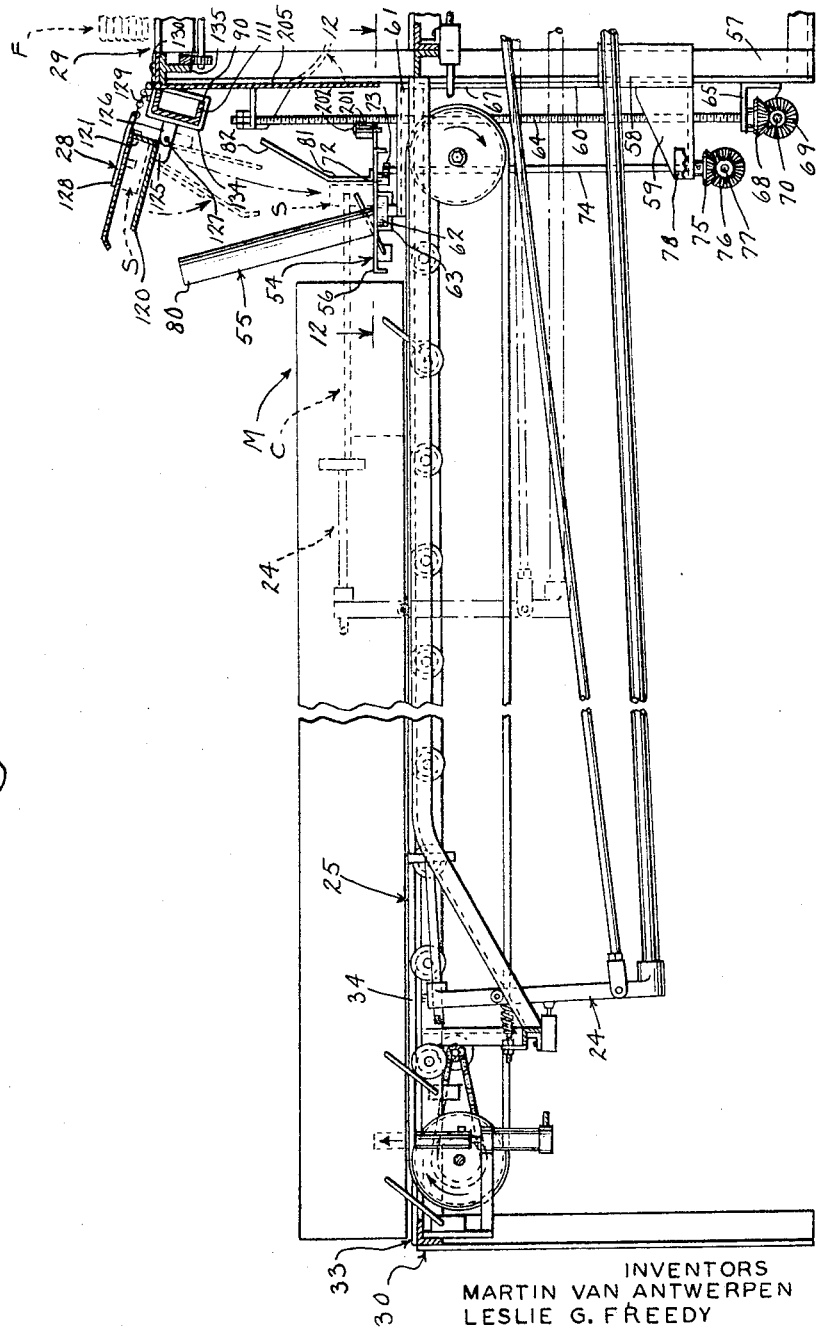
FIGURE 2 is a fragmentary longitudinal section through the machine, the section being taken on the line 2—2 of FIGURE 1, looking in the direction of the arrows, and particularly showing the structure of the packaging strip guiding and delivering mechanism and the platform for receiving the cushioning strip.
Figure 3:
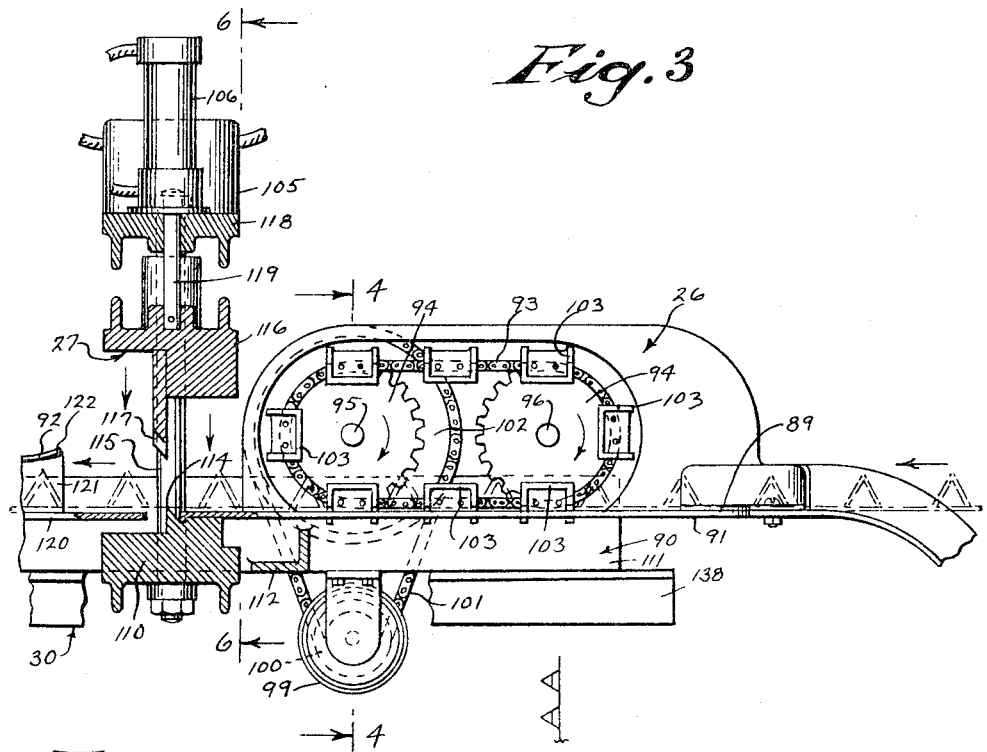
FIGURE 3 is a detail transverse sectional view taken substantially on the line 3—3 of FIGURE 1 looking in the direction of the arrows, the view illustrating in particular the means for advancing a peaked cushioning and shock absorbing strip across the machine and also illustrating the means for severing a measeured quantity of the strip from a length.
Figure 13:
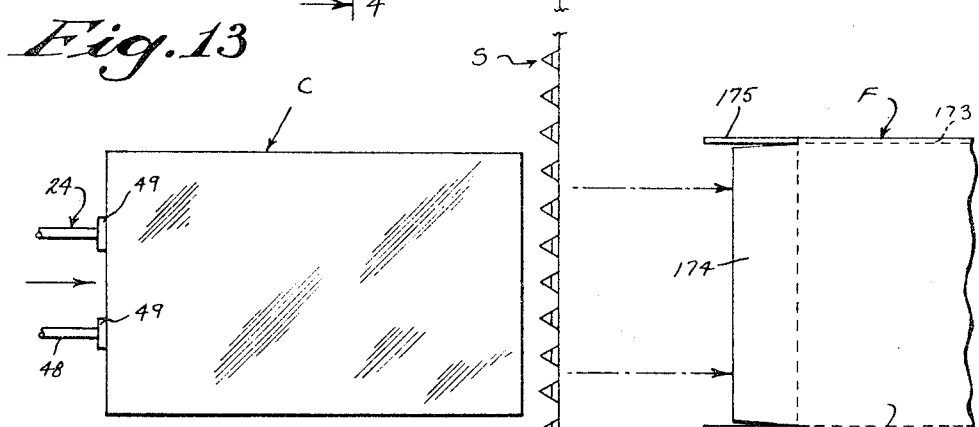
FIGURE 13 is a diagrammatic view in top plan showing a cabinet being advanced toward a cut and measured cushioned peaked strip.

Referring to the drawings in detail, wherein similar reference characters designate corresponding parts throughout the several views, the letter M generally indicates the machine for wrapping and packaging cabinets in cartons and this machine includes conveyor means 25 for receiving medicine cabinets C from an advancing conveyor (not shown) leading from the assembly factory line. The machine M also includes a peaked shock absorbing cushioning strip, advancing and measuring mechanism 26, a guillotine or severing mechanism 27 and a strip holding, guiding and dropping mechanism 28 of the present invention. The peaked cushioning and shock absorbing strip is indicated by the reference character S.

The machine M as shown in the co-pending application further includes means 29 for receiving a stack of carton flats F, for dropping one carton flat at a time and for setting up and squaring a dropped carton, and correlated means 24 for pushing an advancing cabinet off of the conveyor 25 past the strip guiding and dropping means and into a carton and for carrying a carton packed with the cabinet and cushioning strip out of the machine. All of these parts are supported on a suitable fabricated framework 30.

Now referring more particularly to the cabinet conveying mechanism 25 it can be seen that the same is positioned directly in front of the cushioning strip advancing, cutting and dropping mechanism and that these last mentioned parts are arranged directly in front of the carton stack hopper, the carton dropping mechanism and the carton setting up and squaring mechanism.

By referring to FIGURES 1 and 12 it can be seen that the mechanism 26 for advancing the peaked cushioning and shock absorbing strip S and for cutting off a measured quantity of the strip and the strip guiding and dropping means 28 are disposed transversely of the machine and above a receiving platform 54 and the strip holding and guiding means 55 carried thereby. This receiving platform and the strip guiding and holding means are of importance, and it is to be noted that the platform includes spaced companion sections 56. These sections lie on opposite sides of the forward ends of the conveyor belts 34. These platform sections 56 are disposed above the table 33 and the sections are spaced a sufficient distance apart to permit the riding of a cabinet between the same, for a purpose which will now appear. It is to be noted, however, that these sections 56 support a measured length of the strip S and that the strip S extends across the space between the platform sections. The platform sections are at an angle and height so that a mirror portion of the advancing cabinet will engage that part of the strip S between the table sections 56.

The platform sections 56 are adjustable toward and away from one another transversely of the machine M so as to accommodate cabinets of various widths and are adjustable up and down so as to correctly position the strip S in the path of the mirror portion of the cabinet irrespective of its width.

This adjusting mechanism is of a novel construction and the platform sections 56 are supported in a novel manner on the framework 30 as to permit this adjustment. The framework 30 adjacent to the platform sections 56 includes upright angular shaped supporting standards 57. These standards have slidably mounted thereon for movement up and down slide sleeves 58 and these sleeves embrace the standards 57. Projecting forwardly from the slide sleeves 58 are brackets 59. The slide sleeves also have formed thereon upwardly extending slide plates 60 which fit flat against the front faces of the standards 57. The upper ends of the slide plates 60 carry forwardly extending sets of spaced arms 61. A set of arms 61 is disposed below each section 56 of the platform. The sets of supporting arms carry guide blocks 62 and these guide blocks are received in guide tracks 63 carried by the lower surfaces of the platform sections 56. Thus, by sliding the sleeves 58 up and down the platform sections can be raised and lowered and by sliding the platform sections 56 on the guide blocks 62 these sections can be adjusted relative to one another. The means employed for raising the guide sleeves 58 and associated parts up and down includes vertically extending feed screws 64 rotatably mounted in bearing blocks 65 carried by the upright standards 57. The feed screws have mounted thereon travelling nuts 66 which are rigidly secured to the upper ends of the slide plates 60 and adjacent to the points of connection of the arms 61 with said slide plates. The arms of the sets of arms 61 can be braced in any preferred manner, such as by the use of depending struts 67 extending down from the arms of the sets to the slide plate 60. To bring about the simultaneous turning of the feed screws 64 the lower ends thereof have keyed or otherwise secured thereto beveled gears 68 which mesh with beveled gears 69 keyed or otherwise secured to a cross-shaft 70. This cross-shaft 70 is rotatably carried by the bearing blocks 65 and one end of the shaft can be provided with a hand crank 71. Hence, by turning the hand crank 71 and rotating the shaft 70 the feed screws 64 will be turned and the nuts 66 will be moved up and down according to the direction of rotation of the shaft.

The platform sections 56 have rigidly secured to their lower faces rack bars 72 and these rack bars have meshing therewith drive pinions. The drive pinions 73 are secured to upright operating shafts 74. The shafts 74 are rotatably carried by the bearing blocks 59. Keyed or otherwise secured to the lower ends of the shafts 74 are beveled pinions 75 meshing with beveled pinions 76 keyed or otherwise secured to a transverse shaft 77. This transverse shaft 77 is rotatably carried by depending plates 78 secured to the brackets 59 which are in turn carried by the slide sleeves 78. One end of the shaft 77 has secured thereto a hand wheel or crank 79 for bringing about turning of the cross-shaft 77. It is to be noted that the pinions 75 engage opposite sides of the pinions 76 on the shaft 77. Thus, these operating shafts 74 will turn in opposite directions to bring about the desired movement of the platform sections 56 toward and away from one another.

Figure 10:
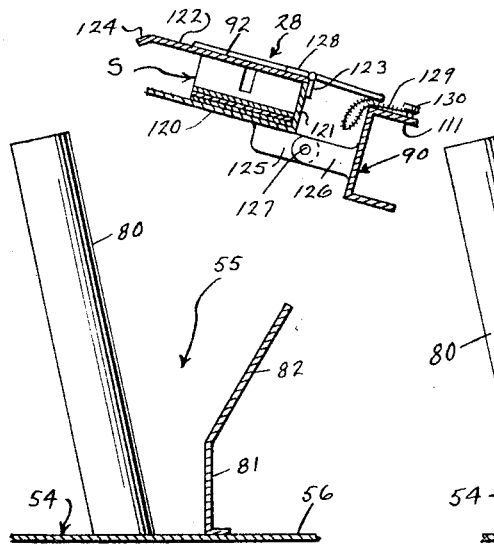
FIGURE 10 is a detail sectional view taken on the line 10—10 of FIGURE 1, looking in the direction of the arrows, and showing the supporting platform and guide means for receiving the strip from the guiding and dropping means, the view showing a strip ready to be dropped.
Figure 11:
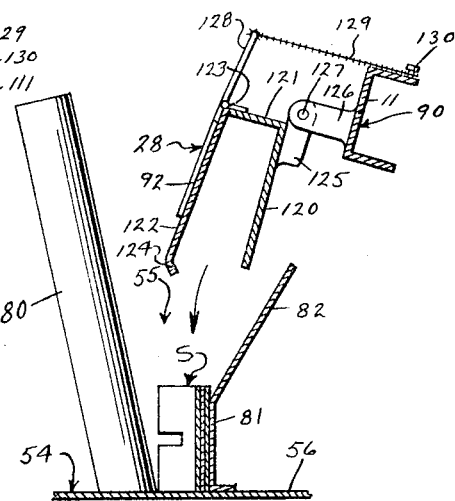
FIGURE 11 is a view similar to FIGURE 10, but showing the strip released from the guiding and dropping means and delivered to the platform and into the guiding and holding means carried by the platform.

The platform sections 56 are provided with the strip holding and guiding means 55 as heretofore mentioned, and this holding and guiding means 55 includes posts 80 which extend upwardly and forwardly at an incline from the platform sections 56. Arranged in front of the inclined posts 80 are upstanding guide walls 81 and the upper ends of these walls are inclined upwardly and inwardly, as at 82, away from the posts 80. As the strip S falls, the same hits the inclined posts 80 and the portions 82 of the guide walls 81 and is guided onto the platform sections and the strip is properly held by said posts and guide walls. This is best shown in FIGURES 10 and 11. As also heretofore stated, the platform sections 56 are located directly below the advancing and measuring mechanism 26; the guillotine or severing mechanism 27 and the strip holding and guiding and dropping mechanism 28.

Figure 14:
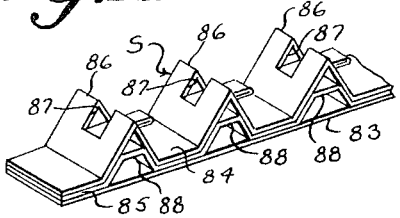
FIGURE 14 is a fragmentary detail perspective view showing the type of cushioning strip utilized in protecting the cabinet.
Figure 8:
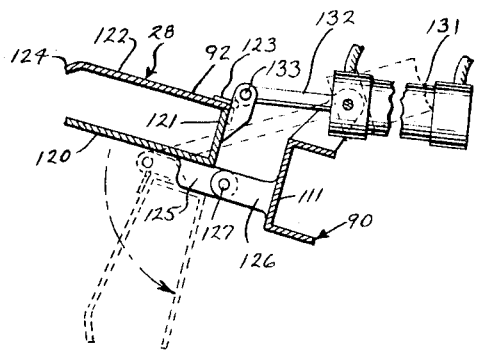
FIGURE 8 is a sectional view similar to FIGURE 7 taken on the line 8—8 of FIGURE 1, looking in the direction of the arrows and illustrating the actuating mechanism for the strip guiding and dropping means.
Figure 9:
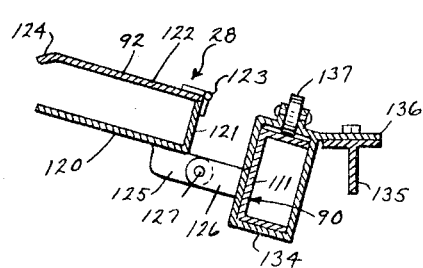
FIGURE 9 is a detail view similar to FIGURES 7 and 8, but taken on the line 9—9 of FIGURE 1, looking in the direction of the arrows.

At this time, it might be well to consider the type of cushioning strip being handled by the machine M, and such strip is illustrated in detail in FIGURE 14. The strip S is also well shown in FIGURES 23 to 31, inclusive, of the Van Antwerpen Patent No. 2,504,473 issued April 18, 1950. This patent also illustrates a machine for making the strip. The strip S includes a base ply 83, an outer ply 84 and an intermediate ply 85. The inner ply 84 is provided at equidistantly spaced points with cushioning peaks 86 and these peaks are provided with slots 87 in which the edge of the mirror portion of the cabinets C fit. The intermediate ply 85 is also provided at equidistantly spaced points with outwardly projecting peaks 88 of a less height than the peaks 86 and these peaks 88 are fitted within the peaks 86 and the marginal edge of the glass portion of the cabinet rests on these peaks 88. The walls of the slots 87 engage the upper and lower faces of the glass and prevent shifting of the cabinet relative to the strip. Again referring to FIGURE 11 it can be seen that when the strip rests on the platform sections that the peaks 86 face toward the guide posts 80 so that an approaching cabinet will engage the peaked portions of the strip.

The guillotine or severing mechanism 27 is positioned between the strip advancing mechanism 26 and the strip guiding and dropping mechanism 28.

The strip advancing and measuring mechanism 26 includes a guide chute 89 which receives the peaked strip S from a roll or the like, not shown, and the strip is fed into the guide chute with the peaks uppermost for a purpose which will now appear. The guide chute 89 is rigidly mounted on a transversely adjustable support 90 carried by the standards 57 as will be later set forth. The chute 89 includes a smooth flat bottom wall 91 and side walls. The chute at its outer end has its side walls preferably curved outwardly to facilitate the guiding of the strip into the chute. The inner or delivery end of the chute is in transverse alignment with a trough 92 which forms a part of the guiding and dropping mechanism 28. Mounted on the chute and the support 90 is an endless chain 93 which constitutes a part of the strip pulling and feeding mechanism. This chain 93 is trained about sprocket wheels 94 mounted for rotation with spaced shafts 95 and 96. These shafts in turn are rotatably mounted in bearing blocks 97 carried by a bracket 98, which in turn is supported by the chute 89 and adjacent part of the support 90. The shaft 95 is driven from a motor 99 and the drive shaft of the motor has keyed or otherwise secured thereto a drive sprocket wheel 100 around which is trained a sprocket chain 101. This chain is also trained about sprocket wheel 102 carried by the shaft 95. The chain at equidistantly spaced points carries forwardly projecting fingers 103 and the fingers can if so desired be of a U-shape in cross-section and these fingers are spaced an exact distance apart which corresponds to the distance between the peaks 86 of the strip S. The fingers of the lower run of the belt face the smooth wall 91 of the chute 89 and the fingers ride over the strip between the peaks 86 and as the chain 93 is advanced the strip S will be pulled off of the roll and moved through the guillotine or strip severing mechanism 27 and into the trough 92 of the strip guiding and dropping mechanism 28.

As an exact measured length of the strip S is fed into the trough 92 this exact measured length is then severed by the guillotine mechanism 27. To bring this about a conventional counting device 104 of a well known make is employed and this counting mechanism opens and closes a circuit through a solenoid operated valve mechanism 105, which is also of a well known make for controlling the flow of air or hydraulic fluid to the opposite ends of an operating cylinder 106 forming a part of the guillotine mechanism 27. The counting mechanism 104 includes the usual swinging lever 107 and the outer end of the lever carries the usual roller 108. This roller is disposed in the path of an actuating cam 109 rigidly secured to the shaft 96 of the strip advancing means. Thus, as the points of the cam ride past the lever, such points will actuate the lever and when the shaft 96 has been turned a given number of times the actuation of the lever 107 operates the counting mechanism to close the circuit through the solenoid valve and permits the entrance of fluid into the upper end of the cylinder 106 for bringing about the operating of the guillotine. The guillotine or strip severing mechanism 27 includes an anvil or base 110 which is rigidly mounted on the support 90. The support also carries the trough 92. Hence, when the support is adjusted transversely of the machine to permit the accurate centering of the strip S relative to the space between the platform sections 56; the strip advancing mechanism 26, the guillotine mechanism 27 and the strip guide mechanism 28 (including the trough 92) will all be carried therewith.

At this time, it can be seen that the support 90 includes a main supporting channel beam 111, which extends entirely across the machine and a short front angle beam 112. The angle beam 112 is of an L-shape in top plan and is secured to and cooperates with the main beam 111 to support anvil 110. The front transversely extending portion of the angle 111 cooperates with a part of the frame 30 to carry the support 90, as will be later set forth. The anvil 110 has formed thereon a stationary cutting blade 114 over which the strip S travels. Rigidly carried by the anvil 110 and extending upwardly therefrom, are spaced guide posts 115, and these guide posts slidably support a cutting head 116 which is provided with a shearing cutting blade 117 which cooperates with the anvil blade 114. The upper ends of the posts 115 are rigidly secured together by a tie iron 118 and it is this tie iron that carries the cylinder 106 for operating the cutter head. It can be seen that a piston rod 119 extending from the cylinder is rigidly connected to the cutter head. Upon admittance of fluid to the upper end of the cylinder the cutter head descends and severs the desired measured length of the strip S, and this cut length will lie in the trough 92 of the strip guiding and dropping means 26.

The trough 92 includes an angle shaped main body having a bottom wall 120, a rear wall 121 and a hinged top holding wall 122. The inner edge of this wall is connected by hinges 123 with the upper edge of the rear wall 121. It is to be noted that the outer edge of the top holding wall 122 is provided with a turn down strip retaining lip 124. The entire trough 92 is mounted for swinging movement on the main beam 111. Hence the lower inner corner of the trough at spaced points is provided with hinge leaves 125 which co-act with hinge leaves 126 carried by the beam and these leaves are joined by hinge pins 127. After the desired length of the strip has been cut and a cabinet C is advancing, the entire trough swings down over the platform sections 56 by means which will now be pointed out. However, it is to be noted that as the trough lowers from its substantially horizontal position to a depending vertical position, that the upper wall 122 of the trough is swung outwardly to release the strip from the trough. This is accomplished by securing rearwardly extending arms 128 to the top wall 122 and these arms have connected thereto flexible chains 129 or the like. The inner ends of the chains are secured to the cross beam 112 in any suitable manner, such as by the use of headed studs 130. The chains are of an exact length and as the trough swings down the chains tighten and move the top wall 122 outwardly. This is also best shown in FIGURE 11. It is to be noted that the trough swings down directly between the guide posts 80 and the guide walls 81 on the platform sections 56. This insures the proper guiding and falling of the severed length of the strip S onto the platform sections and in the correct position to be engaged by the advancing cabinet C.

The trough is swung up and down at proper intervals by suitable actuating mechanism which can include operating cylinders 131 carried by the cross beam 111. Piston rods 132 extend out of the cylinders toward the trough and these rods are pivotally connected to the rear wall 121 of the trough by means of pivot pins 133. Upon the admittance of fluid into the outer end of the cylinders the rods 132 will move forwardly and hence swing down the troughs. When the direction of fluid is reversed and fluid enters the forward ends of the cylinders and then the rods are drawn inwardly and the trough will be returned to its normal raised position.

The means for slidably carrying the support 90 includes spaced sleeves or cuffs 134 which embrace and slidably support the main beam 111. These guide sleeves or cuffs 134 are mounted on a part of the framework 30 and this part of the framework 30 will now be described. The framework 30 includes a transversely extending T-shaped cross beam 135 rigidly secured to the upright standards 57. The cuffs in turn carry attaching lips 136 which are welded or otherwise secured to the upright face of the T beam 135. The cuff or guide sleeve 134 at the side of the machine remote from the strip advancing mechanism 26 carries a roller 137 which bears against the upper face of the main cross beam 111. This prevents binding of the cross beam 111 in this cuff during the sliding of this beam for adjustment. The support 90 including its main beam 111 is also supported by the framework 30 adjacent to the strip feeding mechanism 26 and the anvil 27 and the short angle 112 of the support 90 can rest on an angle bar 138 forming a part of the framework 30. This angle 138 is best shown in FIGURES 1 and 12 and the same extends in front of the main beam 11 across the front of the trough 92 and toward the table top section 32 where the same extends downwardly and forms a part of the framework for the table top section. After adjustment of the support 90 is had, the same can be locked in such adjusted position by the means of U-shaped clamp 139 which bears against the angle 112 of the support 90 and the rigid angle bar 138. The clamp 139 is carried by a headed adjusting screw 140 carried by the angle 112. By adjusting the screw it can be seen that the clamps will be brought into tight binding contact with the angle 112 and the angle beam 138.

With the carton in its set up condition the same is now ready to receive a cabinet C and at this time the pusher 49 moves forwardly and pushes the cabinet between the space of the platform sections 56 into engagement with the cushioning strip S and as the cabinet is further advanced the strip is folded around the sides of the cabinet. Means is provided for facilitating the guiding of the cabinet out into the open carton with the strip thereabout. This guide means includes swinging spring pressed guide gates 201 rockably mounted on posts 202 carried by the platform sections 56 adjacent to their inner edges. The gates are spring urged to a normal position across the space between the platform sections 56 and hence an advancing cabinet will push these gates inwardly and the gates will press against the cushioning strip S and help to hold the folded sides of the strip against the side edges of the mirror portion of the cabinet. The folding back of the cushioning strip around the sides of the cabinet is facilitated by the guide posts 80 carried by the platform sections.

Thus, it can be seen that a machine M has been provided for receiving cabinets from a conveyor system for advancing the cabinets one at a time by conveyor and pusher toward the novel cushioning strip dropping and holding mechanism of the present invention, and thereafter, the strip is folded around the mirror portion of each cabinet and the cabinet is then directed into a carton flat and off of the machine.

While we have shown and described certain specific embodiments of our invention, it will be understood that these are merely for the purpose of illustration and description, that various other forms may be devised, and that changes in the details of construction may be made, without departing from the spirit of the invention or scope of the appended claims.

What is claimed as new is:

1. In a packaging machine, means for feeding and cutting a measured length of a packaging cushioning strip of the type having a base ply and at least one second ply having a series of equidistantly spaced outwardly projecting cushioning peaks, including a chute for receiving the strip, a power driven endless chain disposed longitudinally of the chute and provided with laterally projecting equidistantly spaced slats and according to the spacing of the cushioning peaks for engaging the strip between said peaks for moving the strip over the chute during operation of the chain, a strip severing means positioned at the end of the chute, and means for operating the strip severing means from said chain according to the length of the strip being advanced by it.

2. In a packaging machine, means for feeding and cutting a measured length of packaging strip of the type having a base ply and at least one second ply having a series of equidistantly spaced outwardly projecting cushioning peaks, said means including a chute disposed transversely of the machine and in alignment with the strip receiving means, a power driven endless chain having laterally projecting slats across the chute with the slats spaced an equal distance apart and the same distance apart as the peaks for engaging the strip between the peaks and for advancing the strip from the chute to the strip receiving means, said strip cutting means being disposed between the chute and the strip receiving means, and means for automatically operating the strip severing means upon the advancement of a predetermined length of strip by said chain and its slats.

3. In a packaging machine of the type for packaging cabinets and having a cabinet advacing means and a carton setting up mechanism, including a packaging cushioning strip feeding means disposed between the carton setting up mechanism and cabinet advancing means, means for receiving the strip from the strip feeding means including a hinged trough, a platform disposed below the hinged trough for receiving a strip therefrom and including a pair of spaced sections between which an advancing cabinet travels, spaced strip holding posts carried by said sections, strip holding walls carried by said sections disposed in front of said posts and means for tilting and swinging said trough downward to drop the cushioning strip between the posts and the walls to hold the strip temporarily on the platform and across the space between the platform sections.

4. A packaging machine as set forth in claim 1, wherein said means for receiving the strip includes, a hinged trough having an open front end, means for swinging the trough downwardly to drop a cushioning strip therefrom and a platform, having a pair of spaced sections disposed below the trough for receiving the dropped strip, said sections being spaced a distance apart to permit the travel of an article therebetween and for engaging a dropped strip.

No references cited.

WILLIAM S. LAWSON, *Primary Examiner.*